United States Patent [19]
Queen et al.

[11] 3,902,452
[45] Sept. 2, 1975

[54] APPARATUS FOR MANUFACTURING CARPET TILES

[75] Inventors: David Stewart Queen, Sanquhar; John Black Edgar, Giffnock; Patrick Ketchen Cassells, Fife; John Felix McHardy, Dundee; Peter William Bell, Beith; Thomas Hutcheson Dick; Wilfred Arthur Stephen White, both of Dundee, all of England

[73] Assignee: Sidlaw Industries Limited, Dundee, England

[22] Filed: Nov. 16, 1973

[21] Appl. No.: 416,602

[30] Foreign Application Priority Data
Nov. 22, 1972 United Kingdom............... 54113/72

[52] U.S. Cl. .................. 118/66; 118/69; 118/236; 118/257; 118/503; 156/539
[51] Int. Cl.² ......................................... B05C 1/02
[58] Field of Search ............ 118/257, 236, 66, 503, 118/69, 245; 156/539, 543, 536; 248/447, 451

[56] References Cited
UNITED STATES PATENTS

| | | | |
|---|---|---|---|
| 2,227,494 | 1/1941 | Gold | 118/245 X |
| 2,442,876 | 6/1948 | Pearson | 118/257 X |
| 3,192,893 | 7/1965 | Bauer et al. | 118/69 |
| 3,666,598 | 5/1972 | Christie et al. | 156/539 X |

*Primary Examiner*—John P. McIntosh
*Attorney, Agent, or Firm*—Finnegan, Henderson, Farabow & Garrett

[57] ABSTRACT

Apparatus for manufacturing carpet tiles comprising an endless belt that is driven continuously past a doctor blade for applying a thick layer of heat-curable plastics material onto the belt, a mechanism for laying carpet pelts onto the coated belt, means for heat-curing the plastics material, and means for stripping from the belt the pelt with its backing of heat-cured plastics material.

5 Claims, 4 Drawing Figures

3,902,452

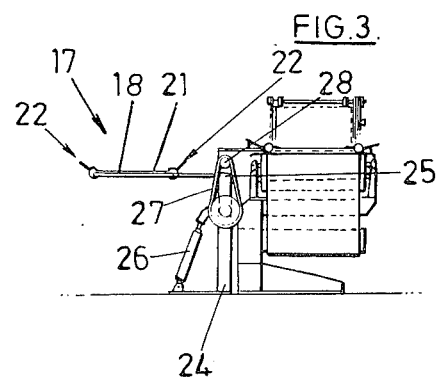
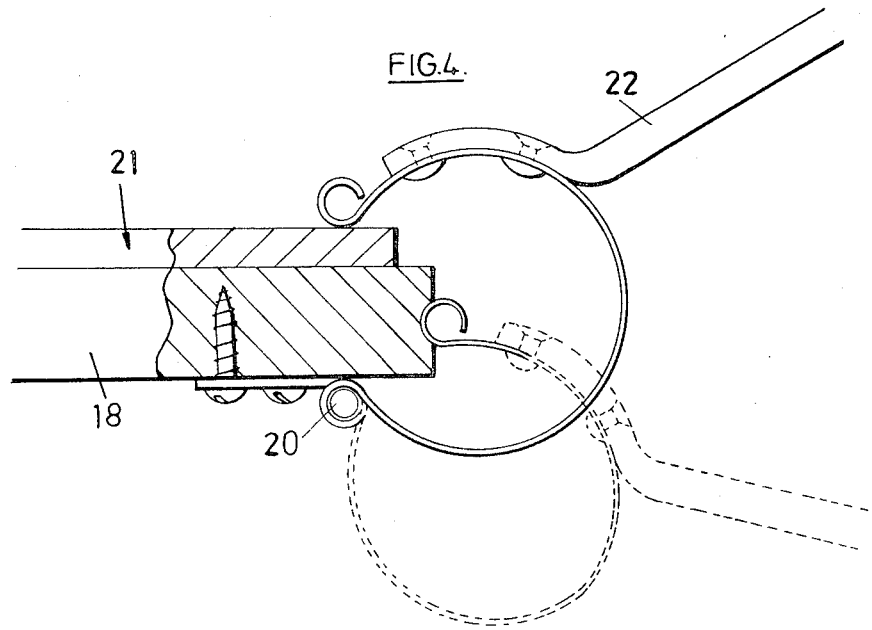

APPARATUS FOR MANUFACTURING CARPET TILES

This invention relates to apparatus for applying a layer of plastics material to form a backing to discontinuous pieces of material. Discontinuous pieces of material as opposed to a continuous web of material, are hereinafter, and in the appended claims referred to simply as "pelts". The pelts may be made of carpeting for use in the manufacture of carpet tiles.

It is known from British Pat. Specification No. 1336707 to manufacture carpet tiles by doctoring a coating of PVC on to a backing of support sheet, placing the pelt of carpet on to said coating, applying heat to the coating to bond the coating to the pelt, cooling the product so formed, the coated pelt then being stripped from the support sheet and trimmed to form a carpet tile.

An object of the present invention is to provide apparatus for carrying out this method continuously.

According to the present invention there is provided apparatus for applying a layer of plastics material to pelts, particularly pelts of carpeting, comprising an endless conveyor belt adapted to be driven sequentially through means for spreading a coating of liquid thermo-setting plastics material on to the belt, and means for laying a pelt on to said coating, over a heating device adapted to bond the plastics material to the pelt by heating same through said belt, and to a stripping member adapted to strip the cured coating and associated pelts from the belt.

An embodiment of the present invention will now be described, by way of example, with reference to the accompanying drawings in which:

FIG. 3 is an end view in the direction of arrow A of FIG. 1; and

FIG. 4 is a detailed view showing a spring clip assembly for use in the apparatus.

Figure 1:
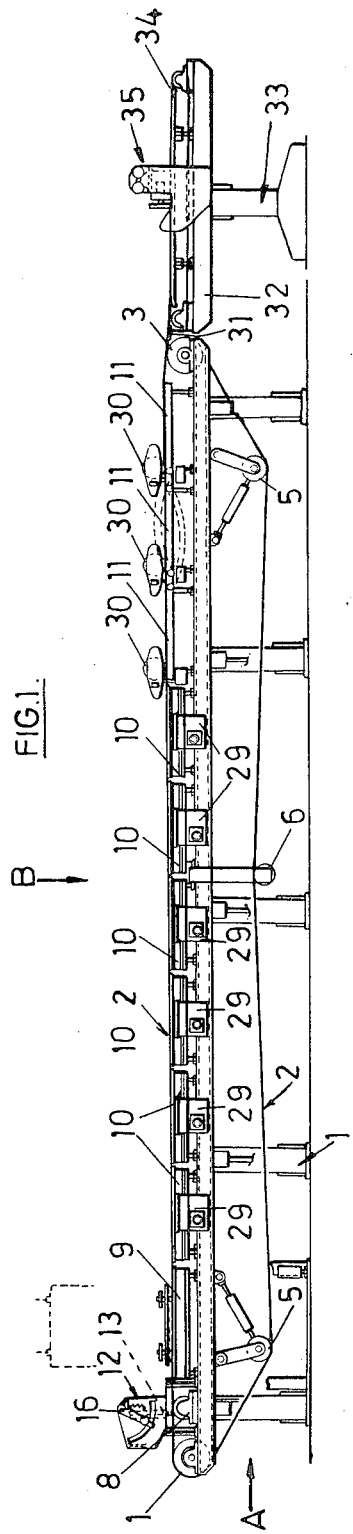
FIG. 1 is a side view of apparatus for continuously backing pelts of carpeting.

Referring to the drawings, apparatus for backing pelts of carpeting with thermo-setting poly-vinyl-Chloride (PVC) comprises a main frame 1 around which a conveyor belt 2 is adapted to run. The conveyor belt 2 is driven through a roller 3 which is itself driven by an electric motor and gearing system 4. The return run of the conveyor belt 2 passes over tensioning rollers 5 and a support roller 6 before passing round an end roller 7 corresponding to the roller 3. The upper or working run of the conveyor belt 2, after passing over the roller 7, is supported firstly by a support roller 8 followed by a support plate 9 and thereafter by six flat hot plates 10 arranged in series along the length of the working run of the conveyor belt 2. After passing over the hot plates 10 the conveyor belt 2 is supported by three cooling plates 11 again arranged in series along the working run of the conveyor belt 2.

The conveyor belt 2 is formed from woven glass fibre coated with polytetrafluorethylene (PTFE) or a silicon resin in order to provide it with non-stick properties.

Above the support roller 8 there is provided a container 12 for liquid PVC and which is provided with a doctor blade 13 adapted to spread an even coating of liquid PVC on to the working run of the conveyor belt 2 as the latter passes over the roller 8. The thickness of the PVC coating may be adjusted by varying the height of the doctor blade 13 by means of eccentric cams 14 mounted on a shaft 15, the rotation of which shaft 15 is controlled by a lever 16. Moreover, the pressure head of PVC is preferably maintained constant to ensure evenness of coating.

Figure 2:
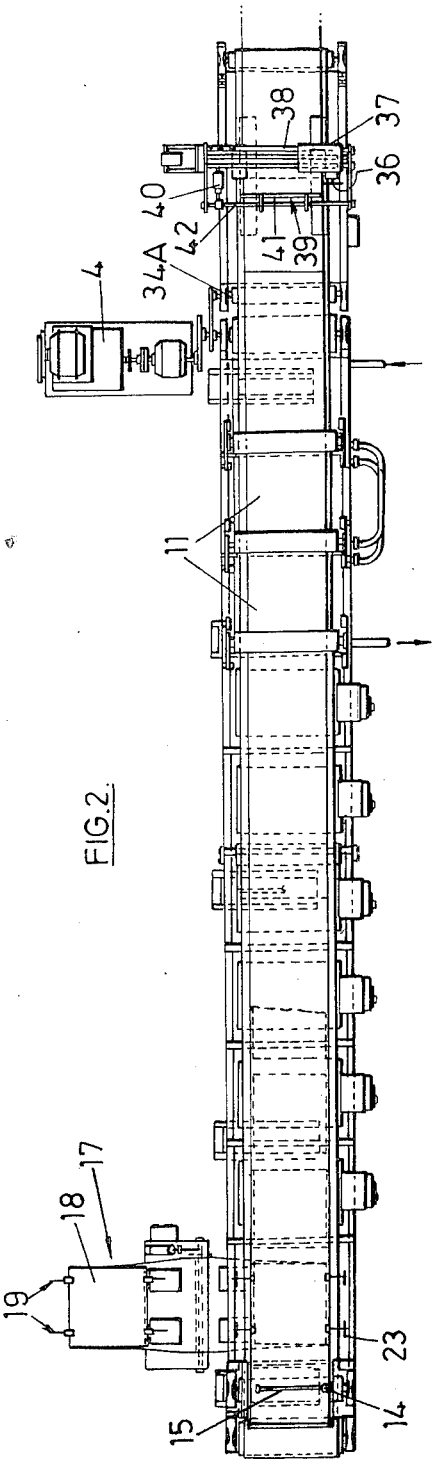
FIG. 2 is a plan view corresponding to FIG. 1.

Adjacent the support plate 9 there is provided a pelt laying mechanism, indicated generally at 17 in FIGS. 2 and 3. The pelt laying mechanism 17 comprises a planar member in the form of a flat board 18 corresponding to the size of a pelt and being provided with four spring clip assemblies 19 which are arranged to secure the pelt to the board 18 prior to laying of the pelt on to the PVC coating on the conveyor belt 2. The spring clip assemblies 19 are shown in detail in FIG. 4 and, as can be seen, each comprises a substantially circular spring clip pivotally mounted at 20 on the underside of the board 18 and adapted to be moved between a retention position, shown in full lines in FIG. 4, in which a pelt 21 of carpeting is engaged by the spring clip and secured to the board 18, and an out of use position, shown in broken lines in FIG. 4. The spring clip is moved between its two positions by a lever 22. Spring clip release bars 23 are provided on the conveyor frame and are positioned automatically to move the spring clips from the retention position to the out of use position when they engage the levers 22. The release bars 23 are adjustable in height so that pelts of varying thickness can be applied to the PVC coating with a substantially uniform pressure which ensure that the pelt is firmly applied to the PVC over its entire area so that no air is trapped between, while not squeezing the liquid PVC from below the pelt so that an uneven coating results.

The board 18 is pivotally mounted on a frame 24 through upstanding lugs 25 and is pivotable between a first position, shown in full lines in FIG. 3, in which an operator secures a pelt to the board and a second position, shown in broken lines in FIG. 3, in which the pelt is laid on to the PVC coating on the conveyor belt 2 when the spring clip assemblies 19 are automatically released by the release bars 23. Pivotal movement of the board is provided by means of a pneumatic piston and cylinder unit 26 which operates a chain drive mechanism 27 connected through a sprocket wheel 28 to the lugs 25.

The hot plates 10 are each provided with a control unit 29 adapted to control the temperature of each hot plate within a predetermined range so as to optimise gellation of the PVC coating on the conveyor belt 2 and so as to provide a predetermined temperature gradient as it moves over the hot plates with the pelts of carpeting laid on its upper surface.

The cooling plates 11 comprise heat exchanger units mounted in a planar casing over which the conveyor belt 2 passes. The heat exchanger units are provided with a flow of cold or refrigerated water to provide the cooling effect and rollers 30 are provided above the cooling plates 11 to ensure good contact between plate and conveyor belt. The cooling water passes into the cooling plates at the end furthest along the working run of the conveyor belt and passes out at the other end so that a gradually decreasing temperature gradient is provided along the cooling plates.

Adjacent the roller 13 there is provided a stripper blade 31 which strips the cured PVC coating and associated carpet pelts from the top surface of the conveyor belt 2 thereby providing a continuous length of PVC coating with carpet pelts spaced along its length. The stripper blade 31 is arranged so that it does not engage the surface of the belt in order to avoid scraping of the PTFE coating on the belt. The PVC coating thus stripped passes over the stripping blade 31 on to a second conveyor 32 comprising a frame 33 and a conveyor belt 34 driven by the motor and gearing 4 through a roller 34A. The conveyor belt 34 is driven at a slightly faster speed relative to the speed of the conveyor belt 2. A pelt separating cutter 35 is mounted above the frame 33 and comprises a rotary cutting wheel 36 driven by a motor 37 and traversable across the conveyor belt 34 on guides 38. A pelt clamping mechanism 39 is also provided adjacent the rotary cutter which mechanism is actuated by a pneumatic cylinder 40 so as to pivot a clamp bar 41 on a shaft 42 so that the clamp bar 41 engages the top surface of a pelt and holds the pelt stationary while the cutter 36 cuts the PVC coating thereby separating the continuous strip between the pelts. The pelts thus separated are passed to a pile cutting machine (not shown) where their edges are trimmed to form carpet tiles.

The pelt laying mechanism 17 may be operated manually or automatically as may be the pelt separating cutter 35.

In operation, liquid thermo-setting PVC is supplied to the container 12 and doctored to form a coating on the conveyor belt 2 as it passes over the roller 27. While the PVC is in a liquid state one of a succession of carpet pelts is laid on to the coating, with its pile upwards, by the pelt laying mechanism 17. The coating with the pelt thereon then passes across the hot plates 10 where the PVC paste is gelled and caused to adhere to the pelt. The coating is thereafter cooled by being passed over the cooling plates 11 and is then stripped from the conveyor belt 2 by the stripping blade 31 after which the continuous coating is cut between the pelts so as to form individual carpet pelts backed with PVC which are then passed to a tile cutting machine, for example, of the type described in British Pat. Specification No. 1338030 where the edges are trimmed and carpet tiles formed.

We claim:

1. Apparatus for applying a thick layer of plastic material to discontinuous pieces of material, particularly pelts of carpeting, comprising an endless conveyor belt, means for driving the belt continuously and in sequence past
    a. means for spreading a relatively thick coating of liquid, heat-curable plastic material onto said belt, said means including a doctor blade for controlling the thickness of said coating;
    b. means which are operable intermittently for laying said pelts onto said coating during the continuous movement of said belt;
    c. a heating device adapted to cure and bind the plastic material to the pelt by heating same through said belt; and
    d. a stripping member adapted to strip the cured coating and associated pelts from the moving belt.

2. Apparatus, according to claim 1, wherein said conveyor belt is also driven past a device for cooling the cured plastic material, said cooling device being located intermediate the heating device and the stripping member.

3. Apparatus, according to claim 1, wherein said means for laying said pelts onto said coating comprises a planar member having a pelt-supporting surface, said member being pivotable between first and second positions, in the first of said positions said surface being spaced from said belt for releasably receiving a pelt to be backed with plastic material, and in the second of said positions said surface overlying the belt for releasing a pelt and laying it on said coating.

4. Apparatus, according to claim 3, including releasable spring clip assemblies attached to said planar member for securing a pelt to said surface thereof, the assemblies being controlled automatically to release a pelt from the planar member upon attaining said second position.

5. Apparatus, according to claim 4, including a support structure at said second position of the planar member, release members mounted on the support structure for controlling the spring clip assemblies, and means for adjusting the position of the release members whereby pelts of varying thicknesses can be laid on the coating.

* * * * *